Patented Sept. 11, 1945

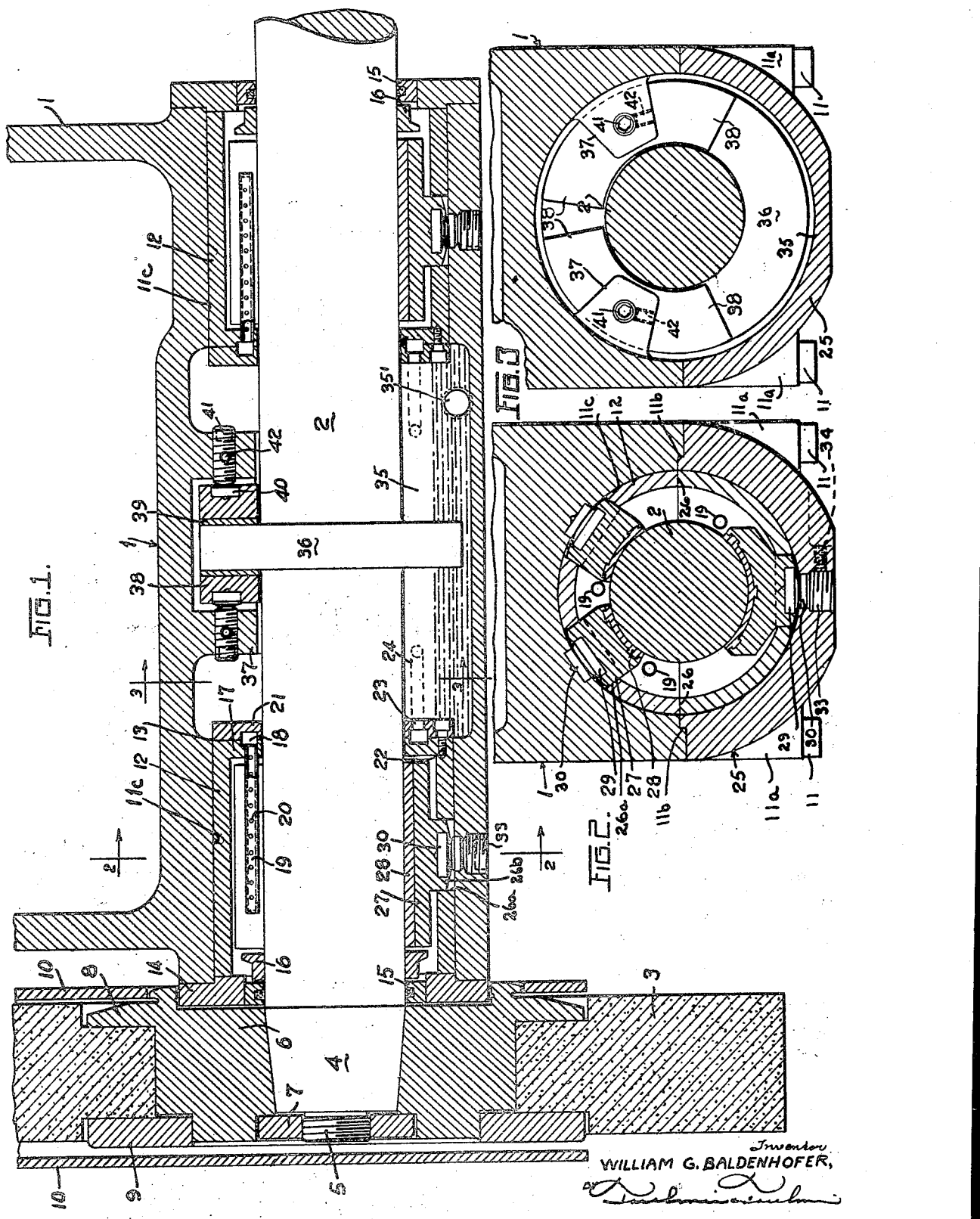

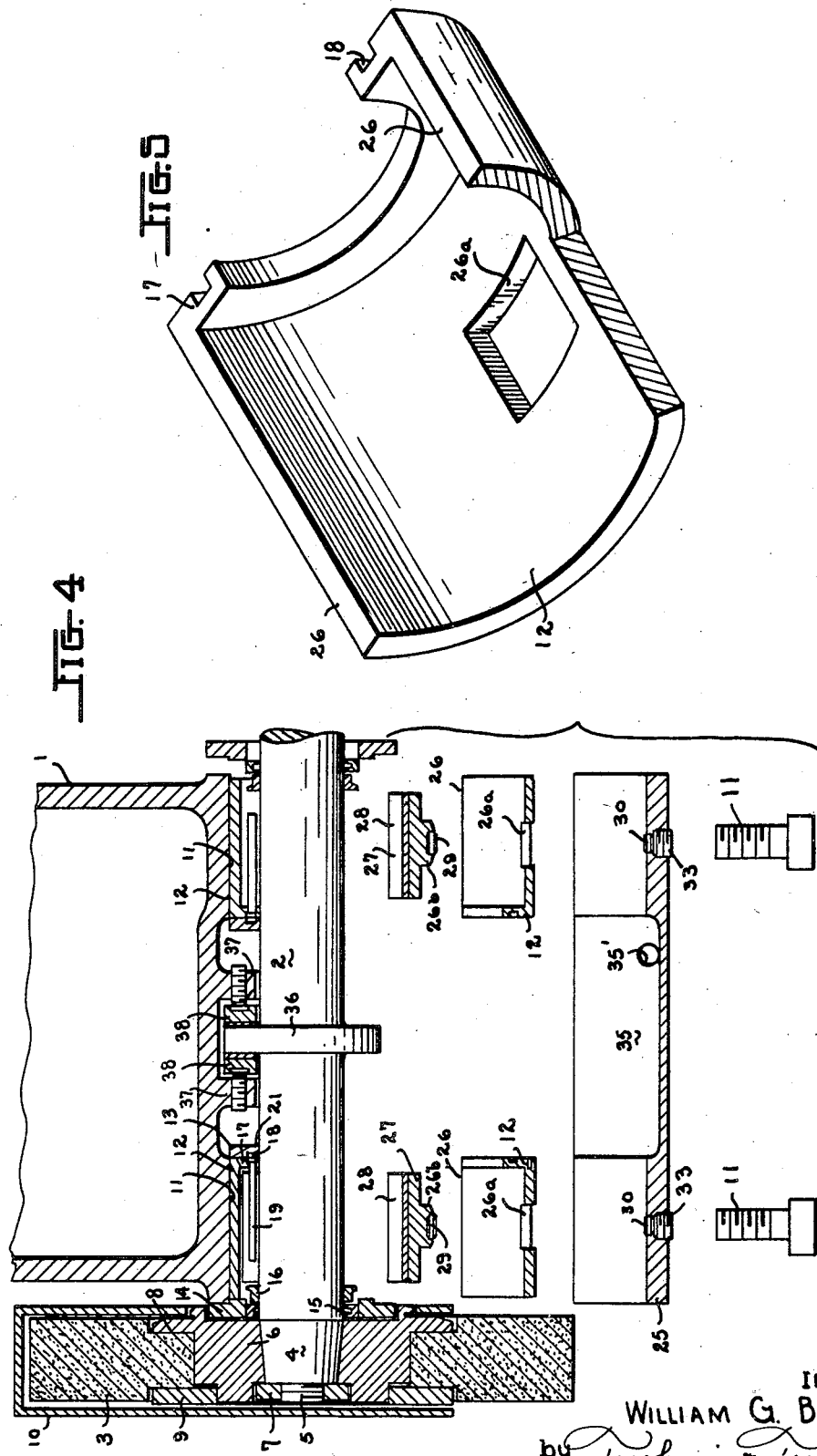

2,384,589

UNITED STATES PATENT OFFICE 2,384,589

BEARING FOR ROTARY SPINDLES

William G. Baldenhofer, Springfield, Ohio, assignor to The Thompson Grinder Company, Springfield, Ohio, a corporation of Ohio Application August 16, 1941, Serial No. 407,184

3 Claims. (Cl. 308—122)

The present invention relates to bearings for rotary spindles such as used particularly in various kinds of machine tools, as for example, in a grinding machine.

In the bearing art it is customary to provide a pair of radial bearings on opposite sides of a thrust bearing, each of the bearings comprising a plurality of pivotally mounted shoes. The problem of accurately adjusting the shoes at each of the bearings is often difficult as the various elements are contained within a completely enclosed housing and subjected to oil under pressure. The shoes often need replacement particularly in the case of high speed rotary spindles which carry a grinding wheel at one end and a motor at the other end, and therefore subject to considerable torsional and gyroscopic strain. Various ways have been devised for making the necessary adjustments for replacements of the various bearing parts but in all cases the structure is complicated and the work required in making the necessary changes is considerable.

The primary object of the present invention is to provide an improved bearing structure for high speed rotary shafts, spindles and the like which are employed in the modern grinding machine, boring mill and similar machines.

A more specific object is to provide a grinder spindle with associated radial and thrust bearings which may be readily assembled, disassembled and adjusted to effect the proper relationship between the bearing surfaces thereof and against improper axial displacement.

A still further object is a provision of improved means for supplying lubricant to both of the radial and thrust bearings.

The general object of the invention is to provide a high speed rotary spindle with improved radial and thrust bearings so arranged as to be readily taken apart, inspected and adjusted together with improved methods of lubrication, all of which are relatively inexpensive and operate with the highest efficiency.

Other objects and features will be apparent as the specification is perused in connection with the accompanying drawings in which:

Figure 1 is a longitudinal section through the improved bearing but showing the shaft and a few other structural details in elevation;

Figure 2 is a sectional view taken along lines 2—2 in Figure 1 and looking in the direction of the arrows; and Figure 3 is a similar view taken along line 3—3.

Figure 4 is a longitudinal sectional view of the improved bearing but with the lower half dropped away from the upper half to show the method of assembly and disassembly.

Figure 5 is a perspective view of the liner or split sleeve which anchors the radial shoes in place.

Referring more particularly to Figure 1, numeral 1 generally designates a portion of a grinding machine frame in the region of the rotary spindle 2 which carries a grinding wheel 3 or other abrading or cutting tool. The spindle is provided at one end with a tapered portion 4 terminating in a threaded extension 5. A clamping plate 6 is mounted over the tapered portion and is held in position by a nut 7, which is secured to the spindle at the threaded end 5. The clamping plate 6 is provided at its under side with an integral radially extending portion 8, which serves as a backing member for the grinding wheel 3, the latter being clamped to the backing member by means of a plate 9 which is threaded on a shoulder formed in the element 6. A guard 10 of any suitable and well-known type may be positioned on opposite sides of the grinding wheel, this guard preferably extending over the entire wheel periphery except at the lower end where the wheel comes in contact with the work.

The frame 1 is usually a casting formed in two halves joined together by bolts 11 at each end which passes through bosses 11a. The two frame halves are aligned by shoulders 11b cut into the abutting surfaces. The assembled frame is provided with bores 11c at the respective ends, and tightly fitted within these bores there is a shoe spacing ring 12. The bores 11c are formed in a shoulder portion indicated at 13, the ring 12 being secured in the axial direction to the shoulder by means of an undercut plate 14 which may be secured to the frame 1. The plate 14 has an internal diameter such as to leave an annular space about the shaft, and an oil seal ring 15 is mounted in this annular space. The shaft is provided with an oil retaining or oil flicking ring 16 at a position adjacent the oil seal 15.

Each ring 12 is provided at its inner surface with a flange 17 which extends inwardly almost as far as the shaft, this flange being provided with an annular groove 18 to which access is made by means of three openings spaced about the flange as indicated in Figure 2. These openings receive pipes or conduits 19 closed at one end and containing a large number of apertures 20. The annular groove 18 is completely enclosed by a grooved plate 21 which is screwed as indicated at 22 to the end of the ring 12. The plate 21 is provided with an opening being connected through a pipe conduit system 24 to a high pressure oil pump (not shown). Oil under pressure can therefore be supplied to each groove 18, this oil being forced out through the openings 20 in the form of a multi-spray stream on to the shaft for purposes which will be described presently.

The radial bearings for the shafts are mounted at each end of the frame housing 25 and the rings 12 contained therein are positioned at each radial bearing. The ring is split horizontally as indicated at 26 similar to the housing and the ring portions are held in position by the clamping effects of the bolted frame halves. Each ring is provided preferably in three positions about its periphery with rectangular openings 26a (Figure 5) for loosely receiving the extensions 26b of the shoes. These shoes are illustrated at 27 in Figure 2 and are constituted of elongated rectangularly shaped blocks of metal provided at their inner surfaces with a lining of bearing material 28 such as babbitt.

The shoes 27 are permitted to rock along the interior surface of the bore 11 in the peripheral and longitudinal directions, and for this purpose are given a cylindrically shaped surface with a predetermined clearance between the ends of each block or shoe and the bore. Each shoe is provided with a hardened metal insert 29 which projects slightly beyond the outer surface of the shoe and is given a spherical configuration of somewhat smaller diameter than the cylindrical curvature of the shoe. The insert 29 contacts at its outermost surface with an insert 30 of hardened metal secured to the housing 25 in any suitable and well-known manner. The insert 30 is preferably given a flat configuration where it contacts with the insert 29.

It will be noted that the lower shoe is of greater length as measured around the periphery of the shaft than either of the other two shoes in order to accommodate the greater pressures exercised at this point due to the weight of the shaft and the grinding wheel. This lower shoe is provided with the hardened metal inserts similarly to the other shoes but the insert which is fitted at the housing forms part of a screw 33 which may be rotated from the exterior of the housing in order to move the lower shoe either toward or away from the shaft as may be desired. After the lower shoe has been properly adjusted it is locked in position by means of a screw 34 which enters the housing from the side and is adapted to bear against the screw 33.

It will also be seen from Figure 2 that the lubricating pipes 19 are positioned directly in front of the leading edge of each shoe assuming that the shaft is rotated clockwise, the position of the openings 20 in the pipe 19 being such as to direct lubricating fluid under pressure against the forward edge of each shoe. Due to the presence of the spherically shaped inserts 29 and assuming proper adjustment has been made at the screw 33, the shoes may tilt or rock appropriately to establish and maintain proper bearing films of oil between their bearing surfaces 28 and the peripheral surface of the shaft spindle 2. The oil, after leaving the shoes will pass along the shaft toward the center and will collect in a reservoir indicated at 35 formed at the middle of the housing. The excess oil may be withdrawn from the reservoir through a pipe conduit indicated at 35'. It is apparent that the construction as described provides for a self-adjusting frictionless radial bearing at each end of the spindle 2, the bearing shoes being adapted to tilt or rock to accommodate any irregularities of the shaft or the bearing and in addition the bearing surfaces are adequately lubricated by the forced pressure system.

In accordance with another feature of my invention there is provided an improved thrust bearing for preventing translational or axial displacement of the shaft within the bearing. For this purpose, the shaft 2 is provided with a thrust collar 36 which dips into the oil reservoir at its lower end, and at its upper end is provided with thrust bearing shoes of the same general type as explained in connection with the improved radial bearings. The frame member 2 is provided with a pair of integral radially extending lugs 37 as seen in Figure 3, these lugs serving as seats for a pair of arcuate shaped shoes 38 which are positioned between the collar and each lug. These shoes are provided with an inner layer of bearing metal 39 which bears against the oppositely disposed annular surfaces of the collar. Each shoe is provided with a hardened metal insert 40 having preferably a flat shape at the contact surface. A hardened set screw 41 is threaded through each lug 37 and is provided at its inner end with a spherical surface where it contacts with the insert 40. The distance between the shoes 38 and therefore the pressure exerted at the thrust collar may be controlled by the set screws 41, and when the latter have been properly adjusted, they are locked into position by a screw 42. As in the case of the radially positioned shoes, the shoes 38 are adapted to tilt or rock at the point to point contact made between each insert 40 and the set screw so that the end bearing can accommodate itself to any irregularity in the end movement of the shaft.

Adequate lubrication of the contact surfaces between the collar 36 and the bearing metal 39 is provided by the oil which is picked up from the reservoir by the collar 36 and carried around to the bearing. Forced lubrication is not necessary at the thrust bearing because there are no high pressures exerted by the grinding wheel in the axial direction, so that the thrust bearing is called upon to accommodate only the end movements of the shaft brought about by wear and in extreme cases occasioned when the grinding wheel 3 is riding a ridge which gives it a component of movement in the horizontal direction. On the other hand the radial bearing is required to accommodate large pressures of a variable character in the radial direction and for that reason forced lubrication is highly desirable.

The use of the apertured pipes 19 communicating with an annular groove 18 to which lubrication is supplied under pressure represents not only an inexpensive but highly efficacious manner of providing the necessary lubrication at the radial bearings. The arrangement is such that the pipes can be readily mounted in their openings in the ring 12 at which time they are automatically brought into communication with the annular groove 18 and the latter is closed in a relatively similar manner by merely applying the plate 21. The presence of the oil sealing ring 15 and the oil retaining ring 16 completely prevents any migration or creeping of the oil toward the ends of the shaft, even when the pressure of the oil is as high as five pounds per square inch so that the bearing as a whole is maintained clean and free from oil drip.

The manner in which the combined and radial thrust bearing may be taken apart for inspection, repair or adjustment is illustrated in Figure 4. The bolts 11 are withdrawn permitting the lower half of the housing 25 to be removed from the upper half at the split surfaces and the lower half of the ring 12 together with the lower radial shoe may be also simultaneously removed at this time. It will be noted that the left hand end (Figure 1) of the housing 25 just clears the guard 10 of the grinding wheel so that it is unnecessary to remove either the guard or the grinding wheel in order to disassemble the bearing. After the lower housing 25 and the lower part of the ring 12 have been removed in the manner stated, the upper half of the ring 12 can then be rotated about the bore 11 until it is free of the upper half of the housing. Consequently, all of the three shoes in each of the radial bearings can be effectively removed from the bearing by simply loosening the bolts 11 and removing the entire lower half of the bearing. After the shoes have been inspected or repaired they may be reassembled in the reverse order than that stated above and all of these operations take place without dropping the shaft 2 or the thrust bearing entirely from position. When the lower half of the housing 25 is removed the shaft 2 is held in position at the motor end on account of the coupling with the motor shaft (not shown). At the opposite or grinding wheel end the shaft is held in position by reason of the interior shoulder of the element 6 resting on the internal lower surface of the guard 10. It will be understood that the guard is secured in any suitable manner to the frame of the machine. The shaft and the grinding wheel 3 may be then bodily removed from the upper housing after all of the end thrust and radial thrust shoes have been removed and the coupling between the shaft 2 and the motor has been disconnected. The guard 10 may be disconnected from the frame after the bearing housing has been disassembled. When the radial shoes have been disassembled as explained hereinbefore, ready access can be had to the set screws 41 which adjust the pressure applied by the thrust bearing shoes against the collar 38.

It has been pointed out that the openings 26a in the split ring 12 are of rectangular configuration and have a closed perimeter. The rectangular shape of the opening prevents any tendency of the shoes to rotate in the horizontal direction and the fact that the openings are of closed perimeter provides support to each shoe in all horizontal directions. Thus the ring 12 serves not only to space the shoes in their proper positions about the shaft 2 but in addition prevents any improper movement of each shoe which might introduce friction at the bearing.

It will be understood that I desire to comprehend within my invention such modifications as come within the scope of the claims and the invention.

Having thus fully described my invention, what I claim as new and desire to secure by Letters Patent, is:

1. A bearing structure for a rotary shaft comprising a pair of radial bearings disposed adjacent the opposite ends of the shaft, and a thrust bearing intermediate said radial bearings, each of said bearings comprising a plurality of pivotally mounted bearing shoes, the shoes of the radial bearing being symmetrically disposed with respect to a center line drawn through the center of the shaft and one of the shoes being positioned directly below the shaft, said one shoe being adjustably mounted, a collar on the shaft, a plurality of thrust bearing shoes in contact with opposite sides of the collar and positioned symmetrically with respect to a vertical line drawn through the center of the shaft but all disposed considerably above the lower portion of the collar all of said thrust bearing shoes being adjustably mounted, and means for lubricating the radial and thrust bearing shoes.

2. A bearing structure for a rotary shaft comprising a pair of radial bearings disposed adjacent the opposite ends of the shaft, and a thrust bearing intermediate said radial bearings, each of said bearings comprising a plurality of pivotally mounted bearing shoes, the shoes of the radial bearing being disposed symmetrically with respect to a vertical line drawn through the center of the shaft and one of the shoes being positioned directly below the shaft, said one shoe being adjustably mounted, a collar on the shaft, a plurality of thrust bearing shoes in contact with opposite sides of the collar and positioned symmetrically with respect to a vertical line drawn through the center of the shaft but all disposed considerably above the lower portion of the collar all of said thrust bearing shoes being adjustably mounted, and means for lubricating the radial and thrust bearing shoes, said means comprising apertured pipes in the region of the leading edges of the radial bearing shoes, said pipes being closed at one end and supplied at the other end with oil under pressure, a chamber in which the oil collects positioned directly below the thrust collar, the lower surfaces of said collar being adapted to move through the collected lubricant as the shaft rotates in order to wet the thrust bearing.

3. A bearing structure for a rotary shaft comprising a pair of radial bearings disposed adjacent the opposite ends of the shaft, and a thrust bearing intermediate said radial bearings, each of said bearings comprising a plurality of pivotally mounted bearing shoes, the shoes of the radial bearing being symmetrically positioned with respect to a vertical line drawn through the center of the shaft and one of the shoes being positioned directly below the shaft, said one shoe being adjustably mounted, a collar on the shaft, a plurality of thrust bearing shoes in contact with opposite sides of the collar and positioned symmetrically with respect to a vertical line drawn through the center of the shaft but all disposed considerably above the lower portion of the collar all of said thrust bearing shoes being adjustably mounted, means for lubricating the radial and thrust bearing shoes, and means including set screws for locking said shoes in their adjusted positions.

WILLIAM G. BALDENHOFER.